No. 666,949. Patented Jan. 29, 1901.
J. C. H. WINKLER.
PLOW.
(Application filed Sept. 1, 1897.)
(No Model.) 7 Sheets—Sheet 5.
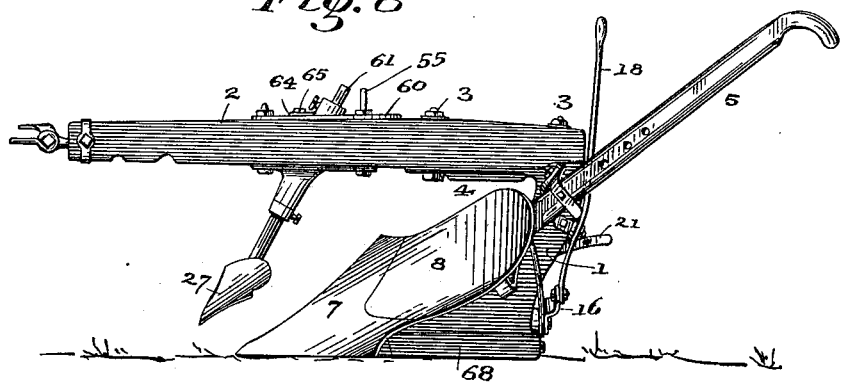
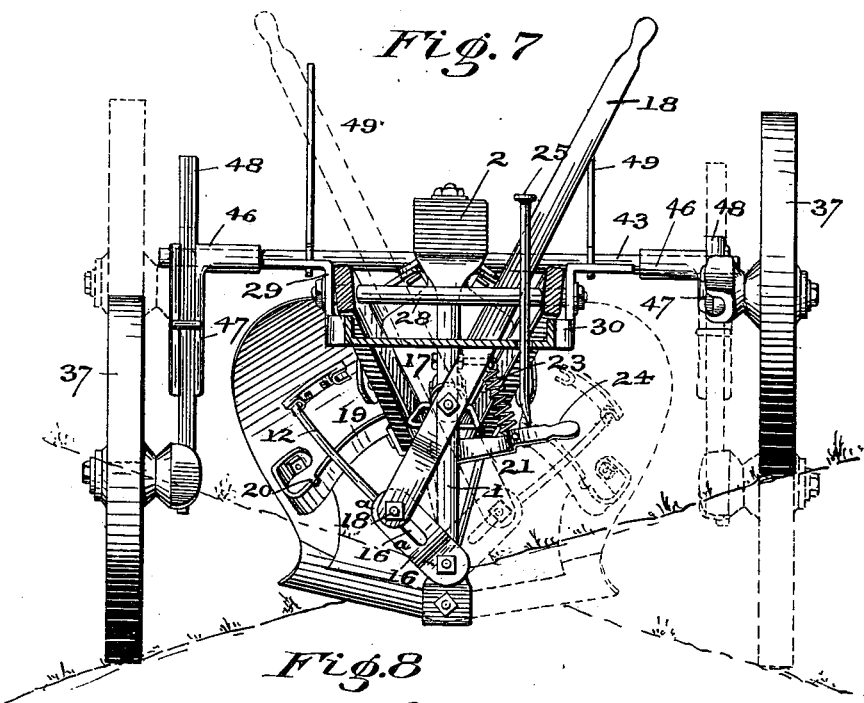
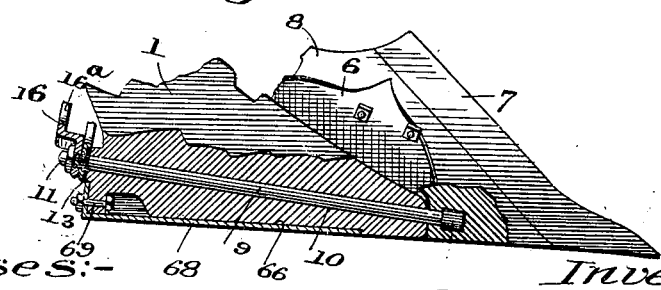
Witnesses:—
Inventor:—
John C. H. Winkler
By his Atty.

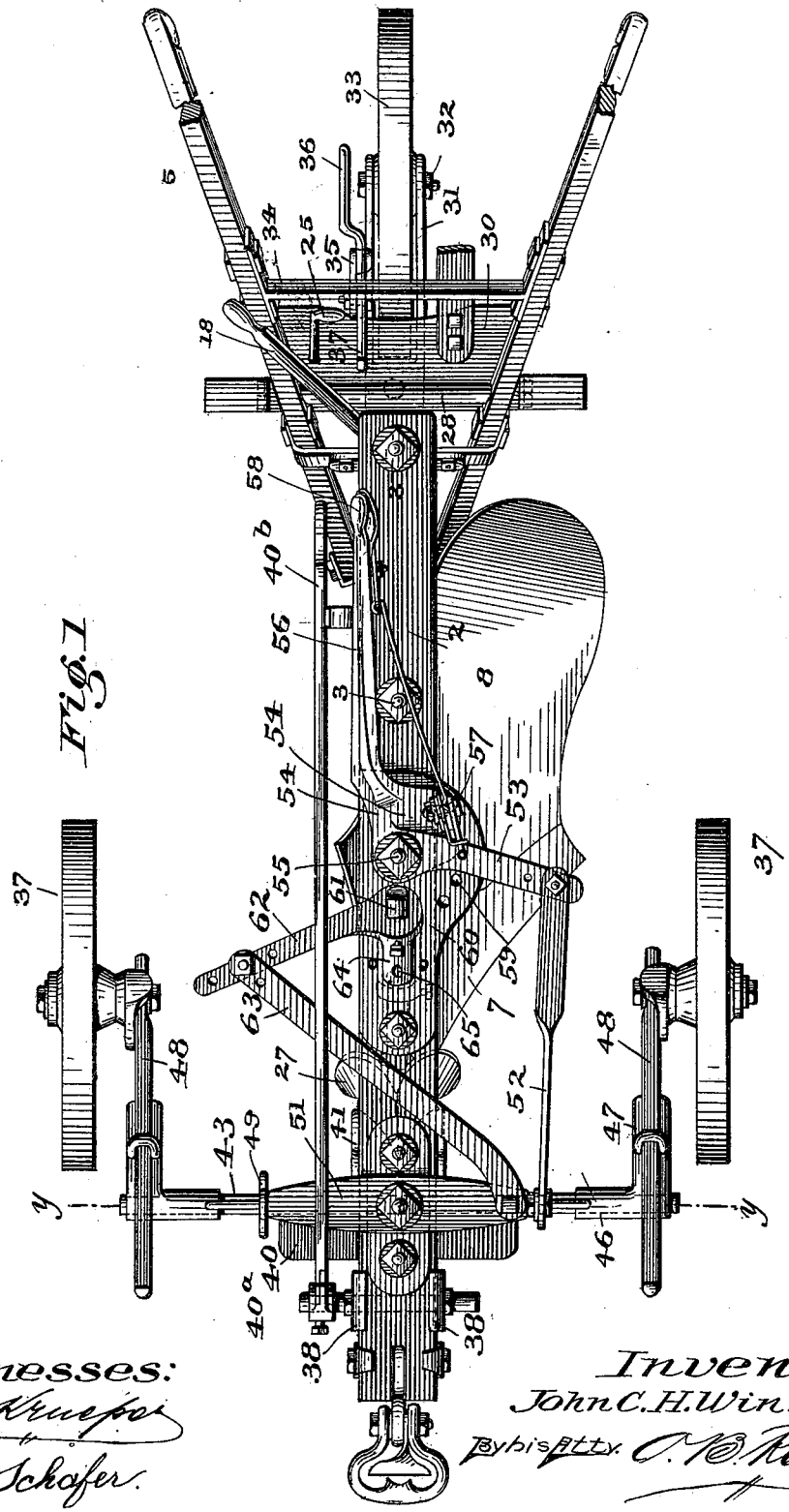

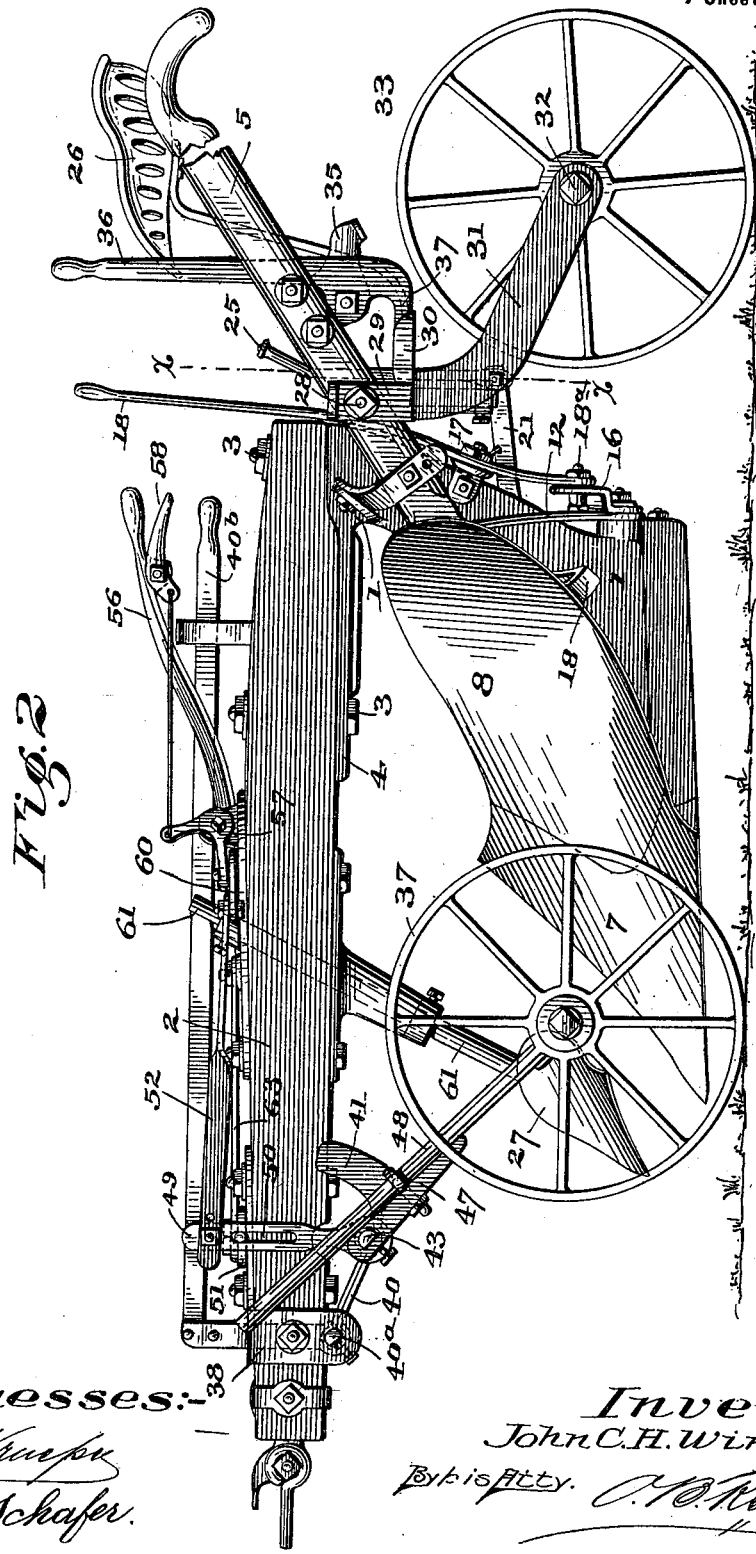

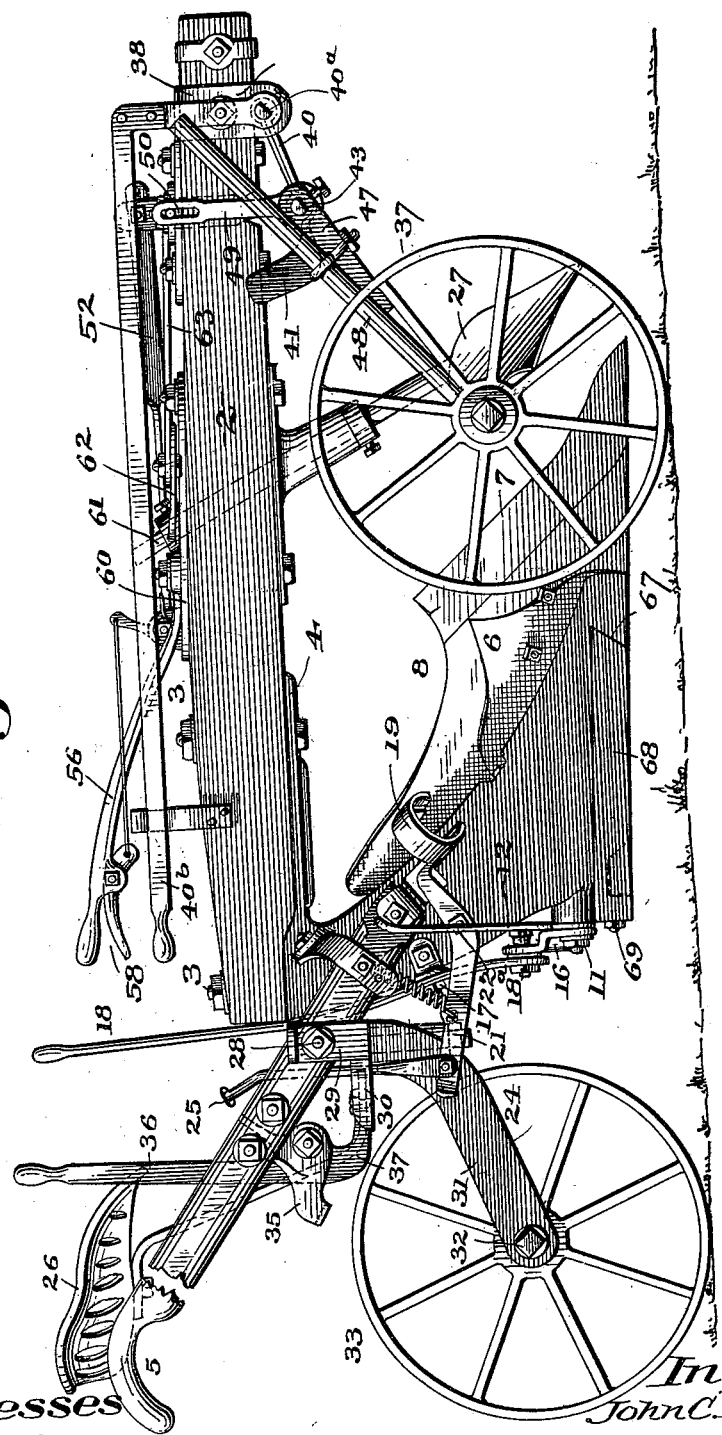

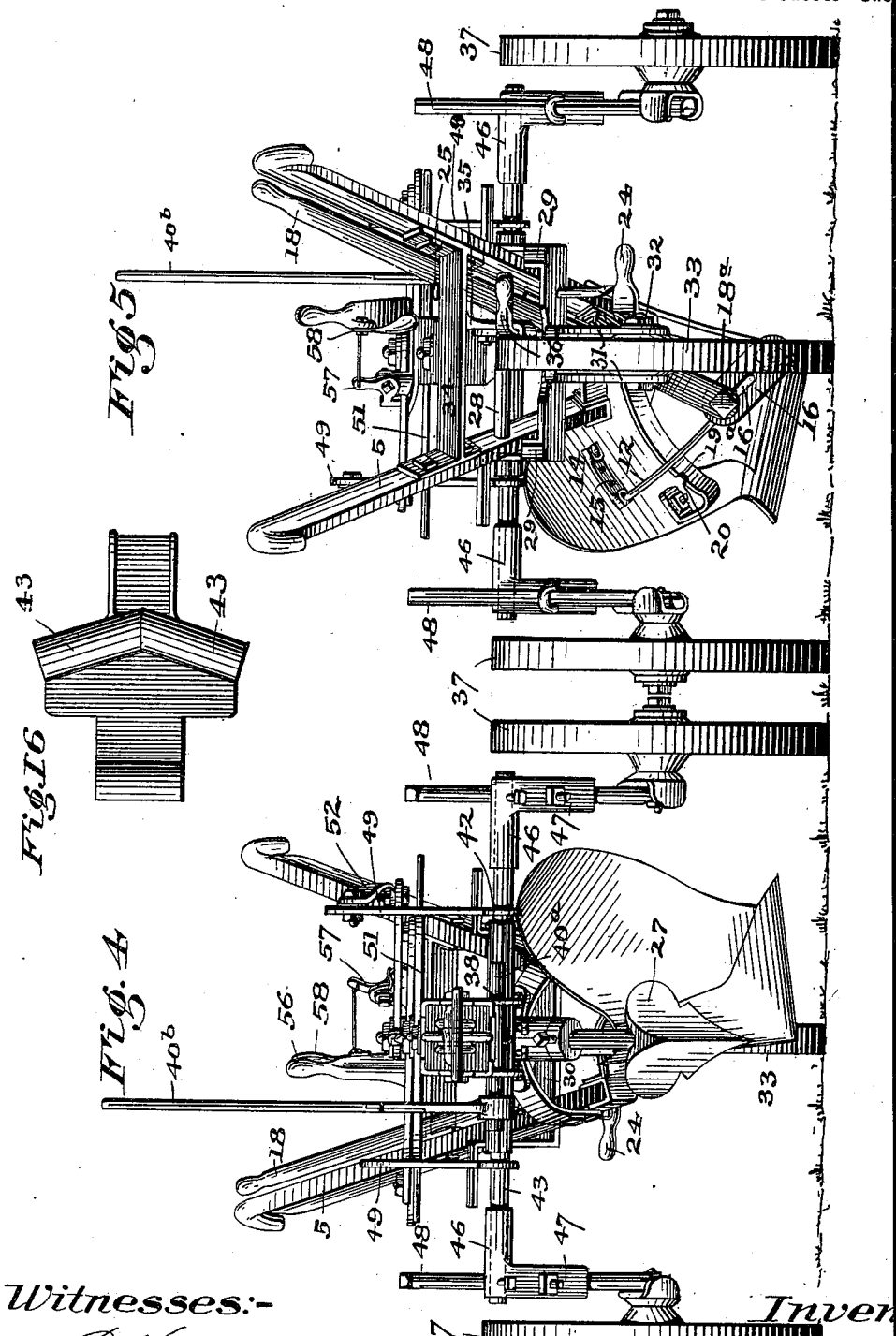

No. 666,949. Patented Jan. 29, 1901.
J. C. H. WINKLER.
PLOW.
(Application filed Sept. 1, 1897.)
(No Model.) 7 Sheets—Sheet 6.
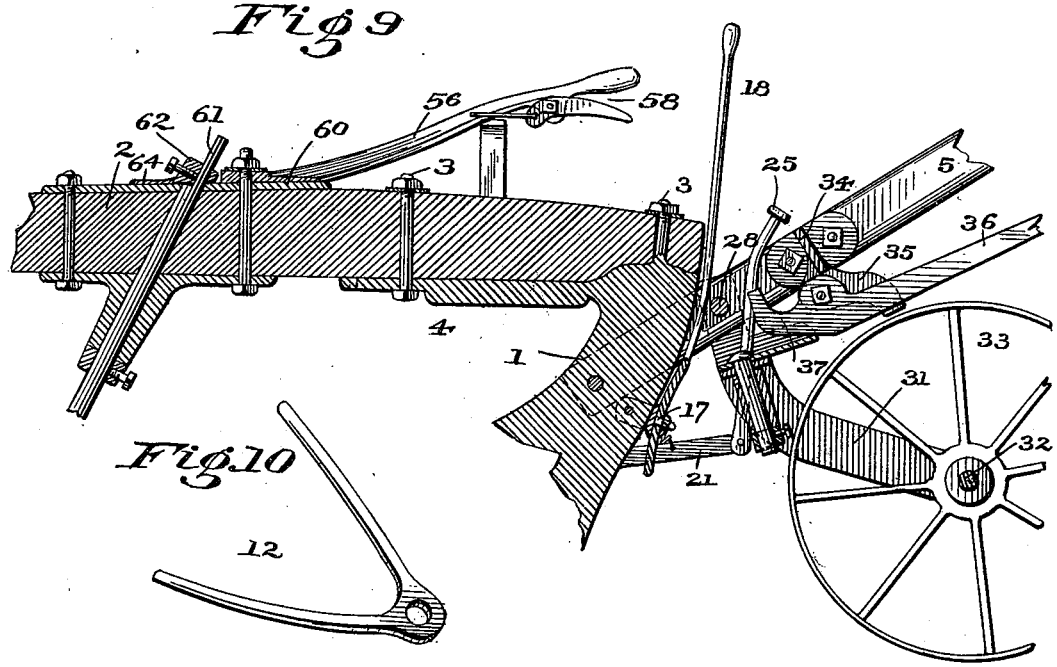
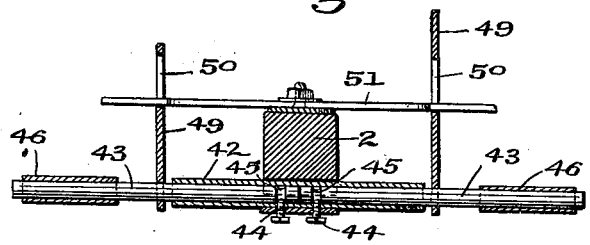
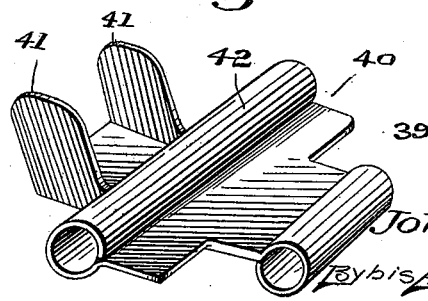
Witnesses:-
Inventor
John C. H. Winkler.
By his Atty.
THE NORRIS PETERS CO., PHOTO-LITHO., WASHINGTON, D. C.

No. 666,949. Patented Jan. 29, 1901.
J. C. H. WINKLER.
PLOW.
(Application filed Sept. 1, 1897.)
(No Model.) 7 Sheets—Sheet 7.
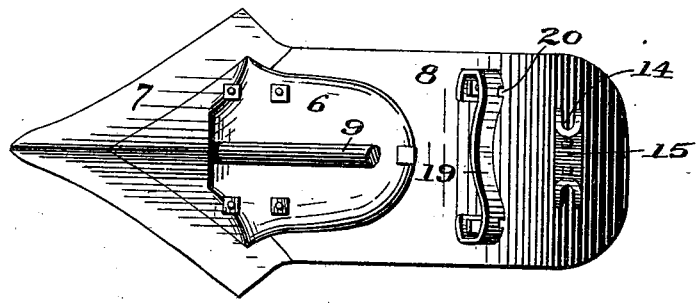
Fig. 13
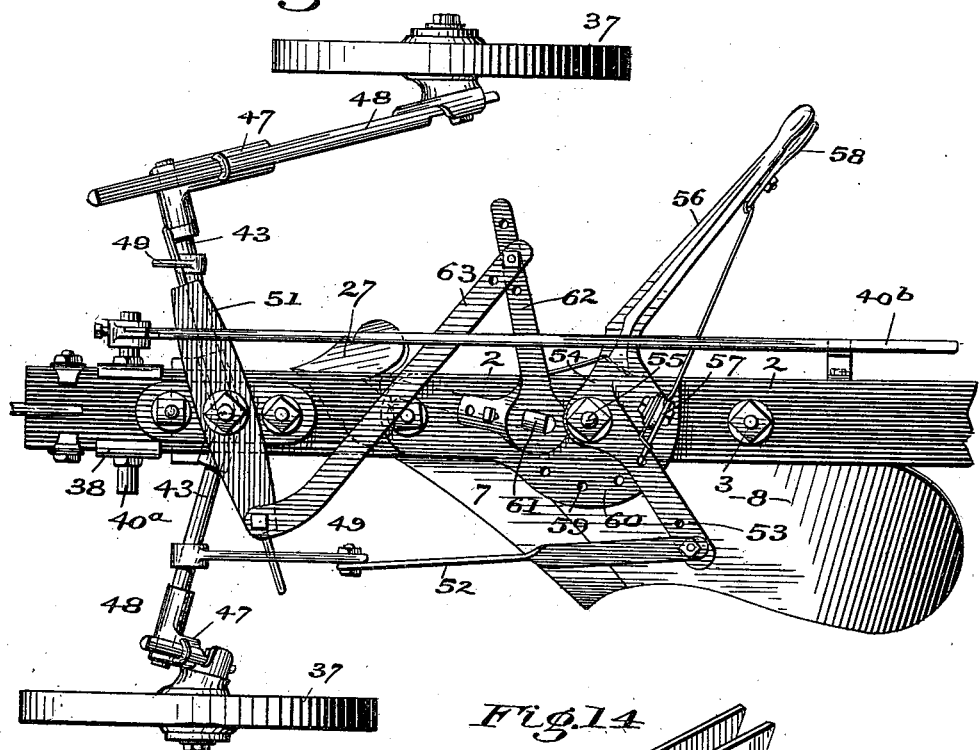
Fig. 15
Fig. 14
Witnesses:-
Inventor:
John C. H. Winkler
By his Atty.

UNITED STATES PATENT OFFICE.

JOHN C. H. WINKLER, OF SOUTH BEND, INDIANA.

PLOW.

SPECIFICATION forming part of Letters Patent No. 666,949, dated January 29, 1901.

Application filed September 1, 1897. Serial No. 650,294. (No model.)

*To all whom it may concern:*

Be it known that I, JOHN C. H. WINKLER, a citizen of the United States, residing at South Bend, in the county of St. Joseph and State of Indiana, have invented certain new and useful Improvements in Plows, of which the following is a specification.

This invention relates to a plow, and has particular reference to a plow adaptable either as an ordinary hand-plow, a sulky-plow, or a hillside-plow; and the object of the invention is to provide a mechanism which can be operated and converted into the several forms of plow heretofore stated.

The invention consists of the parts shown in the drawings, described in the specification, and more particularly pointed out in the claims.

In the drawings, Figure 1 is a plan view of a plow adaptable either as a sulky-plow or a hillside-plow and constructed and arranged in accordance with my invention. Fig. 2 is a side elevation of the plow illustrated in Fig. 1. Fig. 3 is a like view of the opposite side of the plow. Fig. 4 is a front elevation, and Fig. 5 is a rear elevation, of the same. Fig. 6 is a side elevation of a plow denuded of part of the mechanism and adapted for use as an ordinary hand-plow. Fig. 7 is a sectional elevation of the plow, taken at a point indicated by the lines $x$ $x$, Fig. 2, illustrating more particularly the mechanism for reversing the moldboard, &c., and also the mechanism for retaining the moldboard, &c., in their adjusted positions. Fig. 8 is a sectional detail view of the connection between the plowshare and the standard, illustrating the means by which the share and moldboard carried thereby are pivotally secured to the standard. Fig. 9 is a sectional elevation of a portion of the beam, the standard, and the mechanism connected therewith, illustrating more particularly the means for elevating and depressing the rear end of the plow. Fig. 10 is a detail perspective view of the moldboard-support detached from the plow. Fig. 11 is a detail view, partly in section, taken at a point indicated by the line $y$ $y$, Fig. 1. Fig. 12 is a detail perspective view of the forward spindle-hanger detached from the plow. Fig. 13 is a plan view of the under side of the moldboard detached from the plow. Fig. 14 is a detail perspective view of the removable shoe for the heel of the standard. Fig. 15 is a plan view of the plow-beam and the mechanism carried thereby, illustrating a modified construction of hanger for the front-wheel spindles. Fig. 16 is a detail plan view of the said hanger.

1 designates the standard, to which is secured the beam 2 by means of the bolts 3, passed through the beam, and a forwardly extension 4, integral with the standard. Carried by the standard and secured thereto in a well-known manner are the handles 5, all of which are of any of the well-known forms now in use.

6 designates the share, which is pivotally connected to the lower end of the standard and which carries the removable point 7 and the moldboard 8. The share is formed with a rearwardly-projecting spindle 9, which fits within a longitudinal orifice 10 in the lower end of the standard and is secured therein by means of a nut 11, screwed thereon. By this means the share, and consequently the point and moldboard carried thereby, is pivotally connected to the standard and has a movement to either side thereof to adapt the plow either as a right-hand or a left-hand plow.

In order to brace the rear end of the moldboard, I have provided a V-shaped brace comprising two arms 12 extending at an acute angle to each other, there being an orifice at the point of jointure of the arms which is of the size to receive a rearwardly-projecting boss 13 upon the lower end of the standard 1. The upper ends of the brace-arms are of a length to coincide with and to seat within a recess 14, formed in each end of a lug 15 upon the lower side of the moldboard, whereby one of the brace-arms will engage in one of the recesses when the moldboard is upon either side of the standard.

In order to mechanically throw the moldboard from one side to the other, the rear end of the spindle 9 is squared, and secured thereon is an arm 16, provided with a longitudinal slot 16$^a$. Pivotally secured to the rear edge of the standard at 17 is a hand-lever 18, the upper end of which projects within easy reach of the operator, the lower end having an orifice through which and through the slot 16$^a$ in the arm 16 passes a bolt 18$^a$, by which means when the lever is moved from side to side it carries the moldboard therewith, and the moldboard can therefore be changed by the simple manipulation of the lever from one side to the other and the plow be adapted either for a right or left hand plow.

In order to lock the moldboard in its adjusted position, I secure to the rear side thereof a bail 19, having notches 20 in the edges thereof in which engages the end of a spring-catch 21, pivotally secured to the standard at 22, a spring 23 interposed between the same and the handle at all times exerting a tension to hold the catch against the bail. The outer end of the catch-lever is bent outwardly, as at 24, to provide a handle by which the same can be operated by the operator while walking, and a rod 25, pivotally secured to the lever and projecting upwardly above the handles, serves as a means by which the catch can be operated by the operator while upon the seat 26.

The plow thus far described is substantially the same as that shown in Fig. 6 and constitutes an ordinary walking-plow provided with a pivotal share and moldboard and with my improved means for operating and locking the same in an operative position either to the right or left of the standard.

27 designates the colter, which is journaled in castings secured above and below to the beam.

Journaled upon a rod 28, extending transversely and secured to the handles, are depending hangers 29, which carry upon their ends a plate 30, which connects the same. Pivotally secured to said plate, centrally thereof, are arms 31, which are provided at their lower ends with the axle 32 of the rear supporting-wheel 33. Secured to a cross-piece 34, connecting the handles, is a lug 35, to which is pivotally secured a hand-lever 36, having a foot 37 of two angles which abuts when the lever is lowered (shown in Fig. 9) with the plate 30 to hold the plate in a raised position, and consequently the standard and rear end of the plow in a lowered position, which is the operative position for plowing. When the lever 36 is raised into the position shown in Figs. 2 and 3, the plate 30 is lowered and the rear end of the plow mechanism raised and the parts assume the position necessary to enable the plow to be transported from one place to another.

The forward part of the beam when the plow is to be used as a sulky or as a sidehill plow is supported upon the wheels 37 in the following manner: Embracing the beam, at a point near the forward end thereof, are plates 38, the lower ends of which depend beneath the beam, and between them is journaled the forward end 39 of a hanger 40 upon a bolt $40^a$, the rear end of the hanger having upwardly-extending ears 41, which embrace the sides of the beam and serve as a guide for the hanger in its vertical movement. The hanger is provided at a point slightly forward of the ears 41 with an enlargement 42, having a central longitudinal opening, in which are journaled horizontal spindle-shafts 43, the spindles extending into the enlargement 42, from each side thereof, and being held therein by screws 44, the upper ends of which bear in annular grooves 45, located near the inner end of the spindles. The outer ends of the spindle-shafts carry the sleeves 46, which have an arm 47, extending to one side thereof, to which a vertical bar 48 is clamped, carrying upon its lower end the axle of the wheels 37. Therefore as the hanger 40 is raised or lowered by means of the handle $40^b$, secured at one end upon the shaft $40^a$, the opposite end extending in easy reach of the operator, the beam is lowered or raised, respectively, which carrying therewith the standard and its connections renders the plow convertible either in a condition for plowing or to be transported from one place to another.

Secured to the spindles 43 are the lower ends of upwardly-projecting arms 49, each of which is provided with vertical slots 50, in which extend the ends of a cross-bar 51, pivotally secured centrally thereof to the upper side of the beam. Consequently when the cross-bar 51 is moved upon its pivot the spindle-shafts 43 are revolved in opposite directions and the wheels 37 are respectively raised or lowered to travel either on the land or in the furrow or at unequal elevations to conform to the inclination of the land upon which the plow is being worked. In order to move the arm 51, one of the arms 49 projects upwardly, and to the upper end thereof is secured one end of a link 52, the opposite end being secured to one member 53 of a substantially right-angled lever 54, said lever being pivoted at 55 to the beam. The opposite member 56 of the lever serves as a hand-lever, by which means the lever may be moved and the arm 51 revolved. Carried by the lever 54 is a spring-catch mechanism 57, operated by a rod and lever 58, which engage in one of a series of orifices 59 in a plate 60, secured to the top of the beam, whereby the lever 54 and the wheels 37 may be secured in any of their adjusted positions.

The colter 27 is secured upon a shaft 61, which projects upwardly at an angle through an orifice in the beam, and secured upon the upper end of the same is an arm 62, which projects to one side thereof, said arm being connected with the arm 51 by means of a link 63, whereby the colter is turned simultaneously with the adjustment of the wheels 37. Projecting from the arm 62, at an angle thereto, is a lug 64, having a perforation 65 therein, through which and through a corresponding orifice in the beam a bolt is passed to hold the colter in operative position when the plow is utilized as an ordinary walking-plow. To regulate the depth of cut of the plow, the bars 48 are adjusted longitudinally of the arms 47 of the sleeves 46 and are secured in said adjusted position by means of the clamps.

A portion of the lower edge of the standard is reduced, forming a shoulder 66, the shoulder forming the forward wall of reduced portion being inclined, as at 67, and over the reduced portion fits a removable shoe 68, having an inclined forward edge to fit and abut against the inclined wall 67, a bolt 69 retaining the rear end of the shoe to the standard.

As shown in Fig. 15, spindles 43 are journaled in the hanger at an obtuse angle to each other, by means of which construction the wheels move in opposite directions when the spindles are revolved, as described, one wheel moving away from the spindle and also outwardly from the beam, and vice versa, the object of which is to spread the wheels and increase the bearing-surface of the same when the plow is utilized as a side-hill plow.

What I claim is—

1. In a plow, a standard, a share having a rearwardly-extending spindle, a moldboard carried by the share, an orifice in the standard in which the spindle is journaled, an arm 15 secured to the rear end of the spindle having a slot 16 therein and a lever pivoted intermediate its length to the standard having a bolt 18ª at the lower end thereof to enter said slot and operate the arm, substantially as described.

2. In a plow, in combination with a standard and a moldboard pivotally secured thereto, a bail upon the moldboard passing through an orifice in the standard, notches in the bail at each end of the same, and a catch for engagement in the notches when the moldboard is projected to either side of the standard, substantially as described.

3. In a plow, in combination with a standard and a moldboard pivotally secured thereto, a boss projecting rearwardly from the standard, a V-shaped casting comprising two open-ended arms arranged at an acute angle to each other journaled upon the boss, and a lug having recesses upon the under side of the moldboard in which the arms alternately engage, substantially as described.

4. In a plow, a standard, a beam and handles secured thereto and a share and a moldboard carried thereby, a rod extending transversely of the handles and secured thereto, a plate journaled upon the rod, a hanger pivotally secured to the plate, a wheel journaled to the hanger, and a lever having a bearing upon the plate to raise or lower the handles, the standard, and the rear end of the beam, substantially as described.

5. In a plow, a standard, a beam and handles carried thereby, a plate pivotally secured to the handles, a rear wheel having hangers pivotally secured to the plate, and means for raising or lowering the plate to raise or lower the standard, and a seat carried by the plate, substantially as described.

6. In a plow, a standard, a moldboard pivotally secured thereto, the sides of the lower portion of the standard being recessed longitudinally, the forward wall of the recess being inclined, a share fitting over the lower portion of the standard and located in the recess, and a bolt passed through the rear end of the standard and share respectively, substantially as described.

7. In a plow, a standard, a beam carried thereby, ears projecting upwardly from the hanger and embracing the sides of the beam, spindles journaled in the hanger, rods adjustably secured to and projecting at right angles to the spindles and means for revolving the spindles simultaneously, substantially as described.

8. In a plow, a standard, a beam carried thereby, a hanger, carried by the beam, revoluble spindles journaled in the hanger, wheels carried by the spindles, arms secured to and projecting upwardly from the spindles, an arm pivoted to the beam to extend horizontally at each side thereof, its ends engaging with the arms of the spindles, and a hand-lever connected to the said horizontal arm whereby the spindles are rocked, substantially as described.

9. In a plow, a standard, a beam carried thereby, a hanger secured to the beam, spindles having horizontal arms journaled to the hanger at an obtuse angle to each other, wheels carried by the rods adjustably secured to the angle-arms of the spindles, and means for rocking the spindles, substantially as described.

10. In a plow, a standard, a beam carried thereby, swiveled spindles and forward wheels journaled thereto and carried by the beam, a horizontal arm pivoted to the beam for moving the wheels in opposite directions, a colter secured upon a spindle pivotally supported in the beam and connections between the said horizontal arm and colter-spindle, whereby they move in unison, substantially as described.

In testimony that I claim the foregoing as my invention I have signed my name in the presence of two subscribing witnesses.

JOHN C. H. WINKLER.

Witnesses:
B. KRUEPER,
C. H. SCHAFER.